(No Model.)

H. SHUMAN.
Stove Truck.

No. 231,855. Patented Aug. 31, 1880.

WITNESSES:
C. Sedgwick
J. H. Scarborough

INVENTOR:
H. Shuman
BY Munn & Co
ATTORNEYS.

N. PETERS, PHOTO-LITHOGRAPHER, WASHINGTON, D. C.

UNITED STATES PATENT OFFICE.

HIRAM SHUMAN, OF BUCK, PENNSYLVANIA.

STOVE-TRUCK.

SPECIFICATION forming part of Letters Patent No. 231,855, dated August 31, 1880.

Application filed March 13, 1880. (No model.)

*To all whom it may concern:*

Be it known that I, HIRAM SHUMAN, of Buck, in the county of Lancaster and State of Pennsylvania, have invented a new and Improved Stove-Truck, of which the following is a specification.

Figure 1:
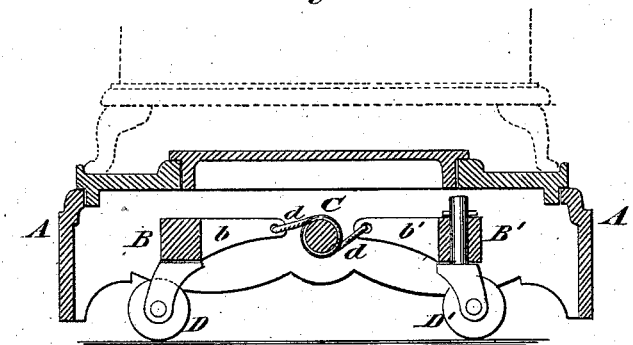
Figure 2:
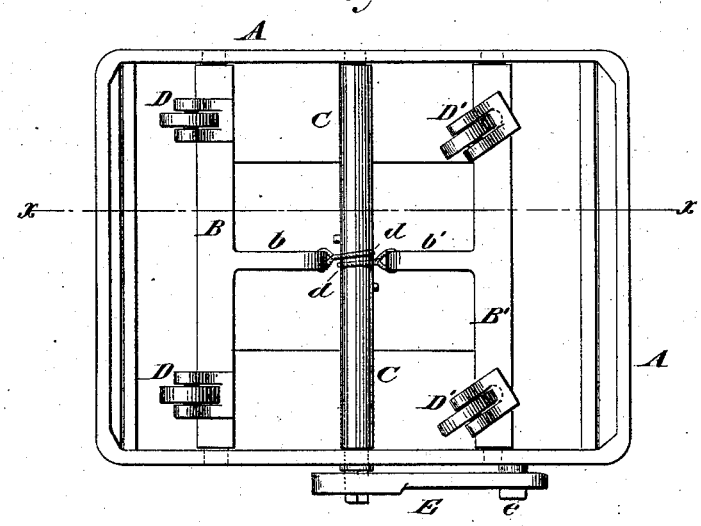

Figure 1 is a transverse section on line $x\ x$ in Fig. 2. Fig. 2 is an inverted plan view.

Similar letters of reference indicate corresponding parts.

The invention consists in combining with a platform parallel locking-shafts supported on fixed and swiveled casters and an intermediate shaft parallel to said shafts, levers being attached to the latter and connected with the intermediate shaft, as hereinafter described.

In the drawings, A is a platform, of iron or other suitable material, in which the rocking shafts B B' are journaled parallel to the ends of the platform and to each other. To the shaft B casters D are immovably attached, and to the shaft B' the casters D' are swiveled or pivoted so that they may turn freely on their pivots.

A shaft, C, is journaled in the center of the platform parallel to the shafts B B'. One of its ends projects through the side of the platform and is squared to receive a lever, E, in the free end of which there is an aperture for receiving the short stud $e$, that projects from the side.

The shafts B B' are provided with levers $b\ b'$, which extend toward the shaft C, and are provided with ropes or chains $d$, that are attached to the said shaft.

The stove, when in use, rests upon the platform, which rests firmly on the floor; but when it is desired to move the stove the lever E is placed on the end of the shaft C, and by it the said shaft is turned, winding the ropes or chains $d$, which, by drawing upon the levers $b\ b'$, turn the shafts B B', thereby raising the platform, so that it is supported by the casters D D'. The end of the lever E, being placed on the stud $e$, retains the platform in this position. The platform and stove together may now be moved as may be required.

Having thus described my invention, I claim as new and desire to secure by Letters Patent—

The combination, with the platform A, of the parallel rocking shafts B B', supported on the fixed casters D and swiveled casters D', the intermediate shaft, C, parallel to said shafts B B', and the levers $b\ b'$, attached to the shafts B B', and connected by ropes or chains $d$ with the shaft C, to form a stove-platform, adapted to be used as shown and described.

HIRAM SHUMAN.

Witnesses:
MARCELLUS H. GROFF,
ROB. N. MOORE.